United States Patent
Clark et al.

(10) Patent No.: US 7,792,785 B2
(45) Date of Patent: Sep. 7, 2010

(54) TRANSLATING TEXT INTO VISUAL IMAGERY CONTENT

(75) Inventors: David K. Clark, Cedar Park, TX (US);
David Salinas, Pflugerville, TX (US);
Theodore J. L. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 11/933,450

(22) Filed: Nov. 1, 2007

(65) Prior Publication Data

US 2009/0119308 A1 May 7, 2009

(51) Int. Cl.
*G06F 17/00* (2006.01)
*G06F 7/00* (2006.01)
(52) U.S. Cl. .................................... 707/602
(58) Field of Classification Search ........................ None
See application file for complete search history.

(56) References Cited

U.S. PATENT DOCUMENTS

| | | | |
|---|---|---|---|
| 4,724,285 A | 2/1988 | Lefler et al. | |
| 4,774,596 A * | 9/1988 | Hashimoto | 386/97 |
| 5,178,542 A | 1/1993 | Chigrinsky et al. | |
| 5,201,042 A | 4/1993 | Weisner et al. | |
| 5,713,740 A | 2/1998 | Middlebrook | |
| 6,219,632 B1 | 4/2001 | Schumacher et al. | |
| 6,250,928 B1 | 6/2001 | Poggio et al. | |
| 6,331,861 B1 * | 12/2001 | Gever et al. | 345/629 |
| 6,349,275 B1 | 2/2002 | Schumacher et al. | |
| 6,532,442 B1 | 3/2003 | Schumacher et al. | |
| 2002/0152077 A1 | 10/2002 | Patterson | |
| 2006/0082820 A1 * | 4/2006 | Anderson et al. | 358/1.15 |
| 2006/0217961 A1 | 9/2006 | Masuichi et al. | |
| 2009/0064029 A1 * | 3/2009 | Corkran et al. | 715/781 |

FOREIGN PATENT DOCUMENTS

| | | |
|---|---|---|
| EP | 0222572 A2 | 10/1986 |
| EP | 1569131 A1 | 8/2005 |
| WO | WO 01/45088 A1 | 6/2001 |

* cited by examiner

*Primary Examiner*—Uyen T. Le
(74) *Attorney, Agent, or Firm*—Francis Lammes; Stephen J. Walder, Jr.; Libby Z. Toub (57) ABSTRACT

A mechanism is provided for translating text into visual imagery content. A request is received to identify at least one image associated with a text value. At least one association category from a plurality of association categories is identified with which to perform a search. A data structure is searched, using the at least one association category, for an identification of the at least one image that is associated with the text value. The at least one image is a visual representation of the text value. At least one image is retrieved in response to identifying at least one image associated with the text value. The at least one image is presented in a graphical user interface to a user.

17 Claims, 6 Drawing Sheets

TRANSLATING TEXT INTO VISUAL IMAGERY CONTENT

BACKGROUND

1. Technical Field

The present application relates generally to an improved data processing system and method. More specifically, the present application is directed to translating text into visual imagery content.

2. Description of Related Art

Translation is an activity comprising the interpretation of a meaning of text in one language into a new, equivalent text in another language. While there are known products that are capable of translating text in one language to text in another language, the translation performed by these known systems is often times contrived and somewhat confusing. That is, known products are often tailored to a particular type of user with a particular need, the particular need being the language translation required by the user. If the user encounters a need for another language translation or a variation of the current language depending on regional dialects, the user usually has to acquire another product or addition to the user's current product for the required translation. Additionally, depending on the product acquired by the user, the product may not be of a quality enough for the user to properly perform the translation, since some words may be wrong and the grammar may be far from perfect.

SUMMARY

The illustrative embodiments provide mechanisms for translating text into visual imagery content. Since there are numerous languages, both spoken and written, and many of these languages may have regional differences, a user may use the provided translation mechanisms to translate text, such as a word or phrase, into a visual image that may be recognized by another person that does not speak the user's native language. The performed text translation may be based on language associations, regional associations, user associations, and/or other types of associations. Each of the associations may be updated or added to by the user, or the user may update the associations by downloading associations from other association data structures. The translation mechanisms present the text translation to the user in the form of one or more images, which the user may then present to another person that does not speak the user's native language in order to convey a message.

The illustrative embodiments provide for translating text into visual imagery content. The illustrative embodiments receive a request to identify at least one image associated with a text value. The illustrative embodiments identify at least one association category from a plurality of association categories with which to perform a search. The illustrative embodiments search a data structure, using the at least one association category, for an identification of the at least one image that is associated with the text value. In the illustrative embodiments, the at least one image is a visual representation of the text value. Responsive to identifying at least one image associated with the text value, the illustrative embodiments retrieve the at least one image. The illustrative embodiments then present the at least one image in a graphical user interface to a user.

In the illustrative embodiments, the text value may be at least one of a word or a phrase. In identifying the at least one association category, the illustrative embodiments may perform the identification with respect to a priority of the plurality of association categories. In the illustrative embodiments, the priority of the plurality of association categories may be set by the user. In the illustrative embodiments, the priority of the plurality of association categories may be stored in user preferences. In the illustrative embodiments, the plurality of association categories may be at least one of a regional association category, a language association category, or a user-defined association category.

The illustrative embodiments may also comprise presenting an error in a graphical user interface to a user in response to a failure to identify the at least one image associated with the text value. The illustrative embodiments may also comprise determining whether an update should be performed to one or more association categories within the plurality of association categories and, responsive to an indication to perform an update of the one or more association categories, updating at least one text-to-image association in the one or more association categories.

In updating the at least one text-to-image association, the illustrative embodiments may also comprise identifying a target text value to be updated, identifying at least one of an existing image or a new image to associate with the target text value to form at least one target image, associating the target text value with the at least one target image to form an updated text-to-image association, and storing the updated text-to-image association in the one or more association categories.

In updating the at least one text-to-image association, the illustrative embodiments may also comprise retrieving the at least one text-to-image association from a third party to form an updated text-to-image association and storing the updated text-to-image association in the one or more association categories.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
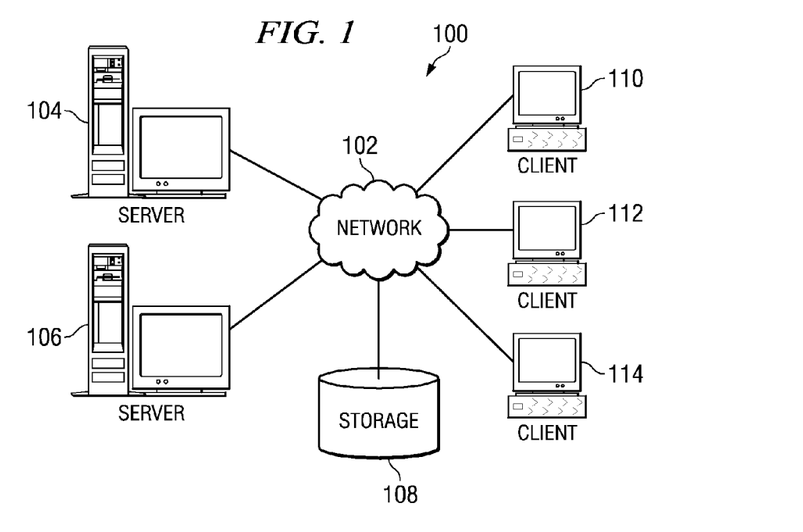
FIG. 1 is an exemplary representation of an exemplary distributed data processing system in which aspects of the illustrative embodiments may be implemented.
Figure 2:
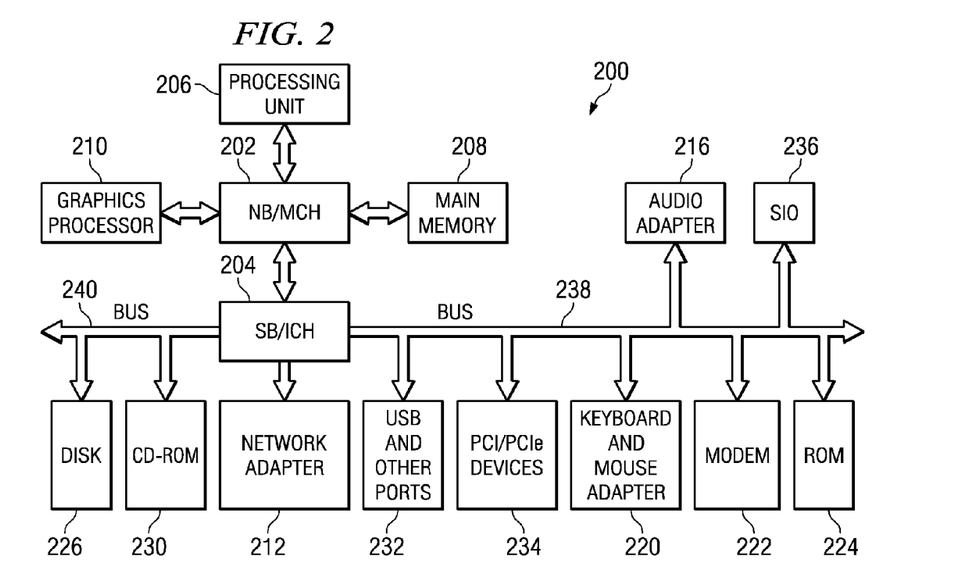
FIG. 2 is a block diagram of an exemplary data processing system in which aspects of the illustrative embodiments may be implemented.

The illustrative embodiments provide mechanisms for translating text into visual imagery content. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p™ and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide mechanisms for translating text into visual imagery content. In the illustrative embodiment, a user is provided with translation mechanisms to translate text, such as a word or phrase, into a visual image that may be recognized by another person that does not speak the user's native language. The performed text translation may be based on language associations, regional associations, user associations, and/or other types of associations. Each of the associations may be updated or added to by the user, or the user may update the associations by downloading associations from other association data structures. The translation mechanisms present the text translation to the user in the form of one or more images. The user may then present the one or more images to another person that does not speak the user's native language in order to convey a message.

Figure 3:
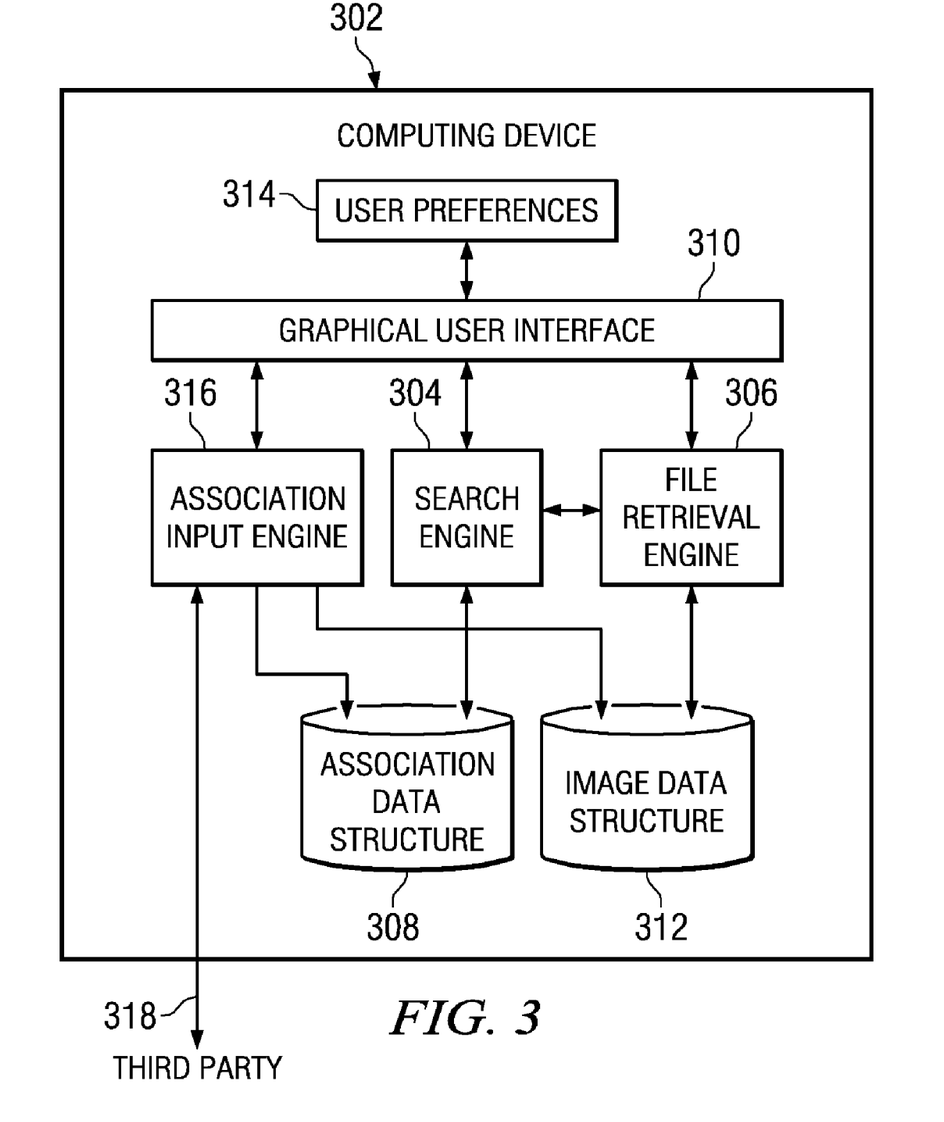
FIG. 3 is an exemplary diagram illustrating the primary operational elements of an illustrative embodiment.

FIG. 3 is an exemplary diagram illustrating the primary operational elements of an illustrative embodiment. As shown in FIG. 3, computing device 302 includes search engine 304 and file retrieval engine 306. Search engine 304 has interfaces to association data structure 308, graphical user interface 310, and file retrieval engine 306. File retrieval engine 306 has interfaces to graphical user interface 310, search engine 304, and image data structure 312. Association input engine 316 has interfaces to graphical user interface 310, association data structure 308, and image data structure 312. While the illustrative embodiments depict association data structure 308 and image data structure 312 locally resident on computing device 302, the illustrative embodiments recognize that association data structure 308 and image data structure 312 may be located remotely and accessed by computing device 302 through a network, such as network 102 of FIG. 1. Association data structure 308 and image data structure 312 may be any type of data structure, such as an actual physical storage device, a plurality of physical storage devices, a portion of a physical storage device, a memory, or the like.

Search engine 304 obtains text from a user using an initial input screen via graphical user interface 310 for which search engine 304 will search for text-to-image associations on local association data structure 308 that are associated with the text value. The user may provide the text in the form of a word, a phrase, or the like. Search engine 304 may identify one or more images that are associated with the received text value, based on the text-to-image associations in association data structure 308. That is, association data structure 308 stores a plurality of associations that indicate a one-to-one relation of a text value to an image. Search engine 304 may then provide an identification of the images associated with the received text value, if any, to the user using graphical user interface 310. If search engine 304 is not able to identify an image associated with the received text value, an error will be presented to the user using graphical user interface 310, such as "No Image Found." If one or more images are identified, the user may be prompted to request the retrieval of the images or, based on user preferences 314, the one or more images may be automatically retrieved by file retrieval engine 306. File retrieval engine 306 may then retrieve the identified images from image data structure 312 and send the retrieved images to the user via graphical user interface 310.

The search performed by search engine 304 may be based on user associations, regional associations, language associations, other associations, and/or any combination of these associations as indicated by the user. The other associations may be associations from one or more third parties, such as a friend or other trusted source. These indications are stored on computing device 302 as user preferences 314. The user may indicate through user preferences 314 that the search performed by search engine 304 is to be performed based on one or more of user associations, regional associations, language associations, other associations, or any combination of these associations. If the user indicates that search engine 304 perform the search based on a combination of associations, then the user may also indicate a priority order in which the associations should be applied.

Thus, once the text is input by the user using graphical user interface 310, search engine 304 uses the preferences in user preferences 314 to communicate with association data structure 308, using known network communication protocols, to perform a search of association data structure 308. Association data structure 308 stores associations based on the associations that are provided by the user, such as user associations, regional associations, language associations, or other associations. That is, a user may store one text-to-image association as a user association and another text-to-image association as a language association. Likewise, the user may store a text-to-image association as a user association and the same text-to-image association as a language association and a regional association.

Search engine 304 applies the text value provided by the user to the text-to-image associations maintained in association data structure 308 to thereby identify images related to the received text value in association data structure 308.

Search engine 304 then retrieves an identification of the images associated with the received text in association data structure 308. Search engine 304 may then send the identification of the images to graphical user interface 310 or directly to file retrieval engine 306 to retrieve the identified images from image data structure 312. Upon file retrieval engine 306 retrieving the identified images from image data structure 312, computing device 302 presents the retrieved images to the user using the appropriate application via graphical user interface 310.

As mentioned previously, in some illustrative embodiments, the user may store new or update existing text-to-image associations in association data structure 308 and the related images in image data structure 312. In order to store or update text-to-image associations, the user accesses association input engine 316 via graphical user interface 310. If the user is updating text-to-image associations from third party 318, association input engine 316 may be set up to automatically download the updated association upon initialization of the translation mechanism or when the user indicates that an update is to be performed. In either instance, association input engine 316 initializes contact with third party 318 through a network, such as network 102 of FIG. 1, and downloads the text-to-image associations to association data structure 308 and any new images to image data structure 312.

If the user indicates a new text-to-image association, association input engine 316 prompts the user for the text portion of the associations. Again the text portion may be a word, a phrase, or the like. After the user has provided the text portion of the text-to-image association, association input engine 316 prompts the user to identify an existing image or provide a new image for the text-to-image association. Once the user has either identified an existing image or provided a new image, association input engine 316 then prompts the user as to which category or categories of association the user was to store the new text-to-image association. After the user has indicated the desired category(ies), association input engine 316 stores the text-to-image association in association data structure 308 and the related image, if the image is new, in image data structure 312. Again, the user may store text-to-image associations based on user associations, regional associations, language associations, and/or other associations. Additionally each text value may have one or more associated images as well as each image may have one or more associated text values. These associations are exemplified in FIG. 4.

Figure 4:
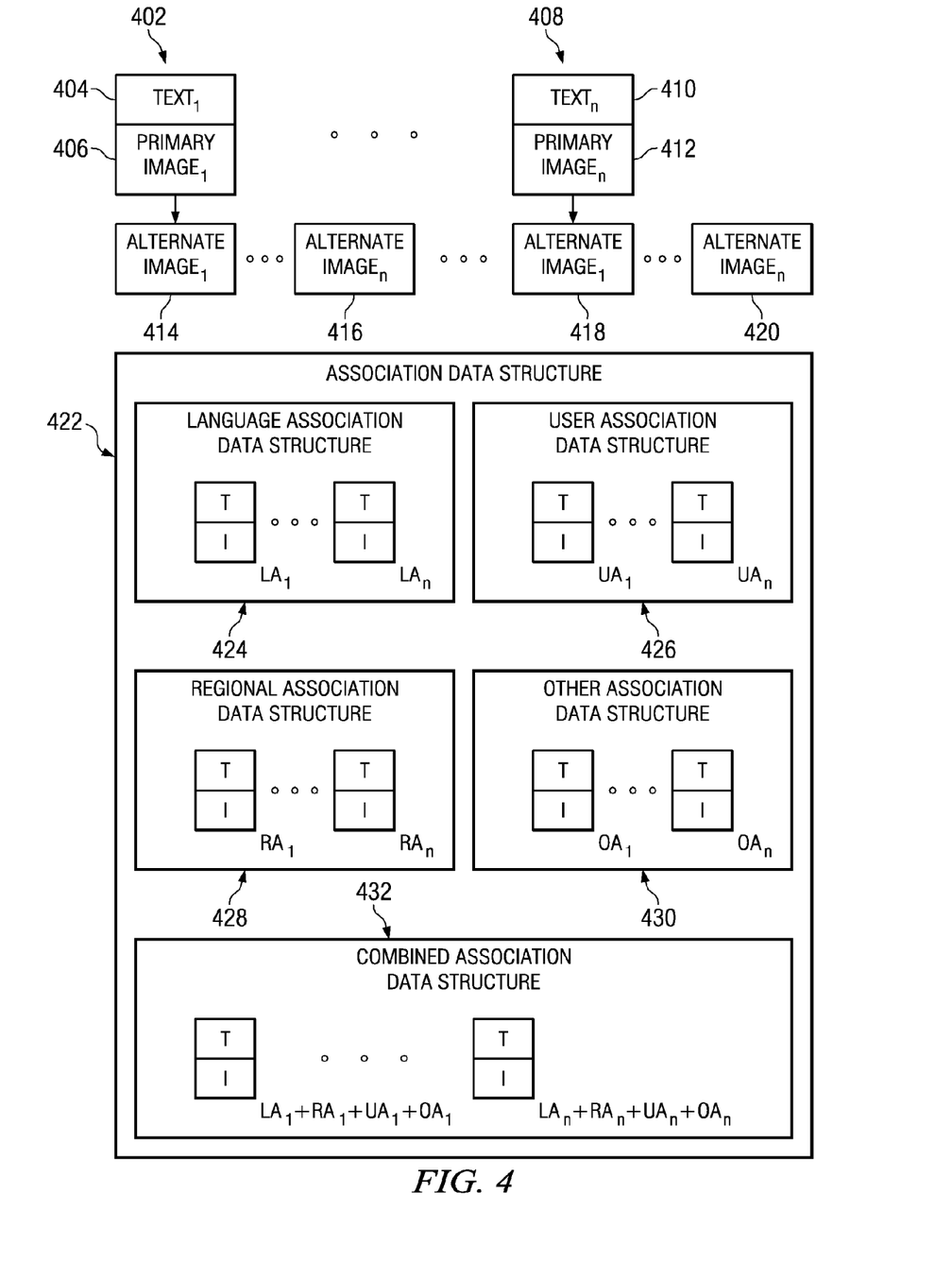
FIG. 4 is an exemplary diagram of text-to-image associations in accordance with one illustrative embodiment.

FIG. 4 is an exemplary diagram of text-to-image associations in accordance with one illustrative embodiment. As shown in FIG. 4, text-to-image association 402 indicates that text value 404 has an associated primary image 406 and text-to-image association 408 indicates that text value 410 has an associated primary image 412. However as also shown in FIG. 4, text value 404 may have one or more associated alternate images 414 and 416 and text value 410 may have one or more associated alternate images 418 and 420. The basis for a text value to have more than one associated images may be that the text value may have more than one meaning or that one or more associated images would provide a better explanation of the translation of the text value to a person that does not speak the user's native language.

For example, if the text value has more than one meaning, such as the text "pitcher", one associated image may show a baseball player throwing a pitch while another associated image may show a water pitcher pouring water. As another example, if one or more associated images would provide a better explanation of the translation of the text value, such as a writing utensil, one associated image may show a pencil while another associated image may show a pen. Thus, each of text values 404 and 410 has one primary image 406 and 412, respectively, and possibly one or more associated alternate images 414-420.

Additionally, one or more of primary images 406 and 412 and alternate images 414-420 may be the same image that is associated with two different text values. For example, if one of primary images 406 and 412 and alternate images 414-420 is an image of a pen, then the image of the pen may be associated with a text value of "pen" as well as being associated with a text value of "writing utensil." Each of text-to-image associations 402 and 408 may be stored in association data structure 422, such as association data structure 308 in FIG. 3, which may include one or more subordinate data structures, such as language association data structure 424, user association data structure 426, regional association data structure 428, and/or other association data structure 430.

Language association data structure 424 may store text-to-image associations based on languages, such as Spanish, German, French, or the like. As such, association data structure 422 may have one or more of language association data structure 424, one for each language the user requires. User association data structure 426 may store text-to-image associations based on the user's personalized translations. Regional association data structure 428 may store text-to-image associations based on regional preferences, such as the text value "soda" being used in the Northeast portion of the United States, the text value "cola" being used in the Midwest portions of the United States, and the text value "Coke™" being used in the Southern portions of the United States. As discussed previously, other association data structure 430 may store associations from third parties, such as friends or other trusted parties. Association data structure 422 may also include combined association data structure 432. Combined association data structure 432 may include all of the text-to-image associations included in language association data structure 424, user association data structure 426, regional association data structure 428, and/or other association data structure 430.

Thus, the illustrative embodiments provide a mechanism through which text-to-images associations may be stored based on one or more categories. The user may create or import an association and store the association in a language, regional, user, or other data structure. A search engine may search the data structures individually, based on a priority list created by the user, or may refer to a combined association data structure to identify one or more images based on a received text value.

Figure 5:
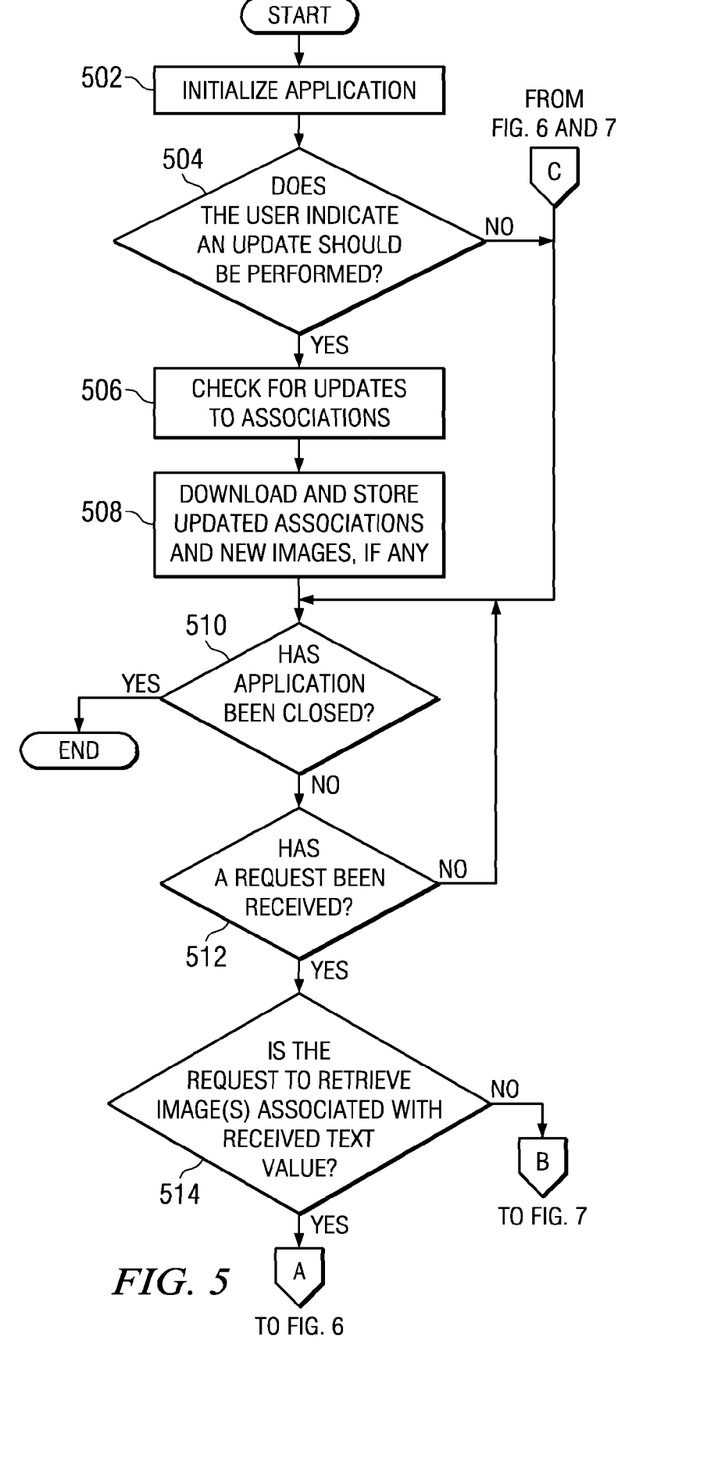
FIG. 5 depicts an exemplary initial operation of the text-to-image application in accordance with an illustrative embodiment.
Figure 6:
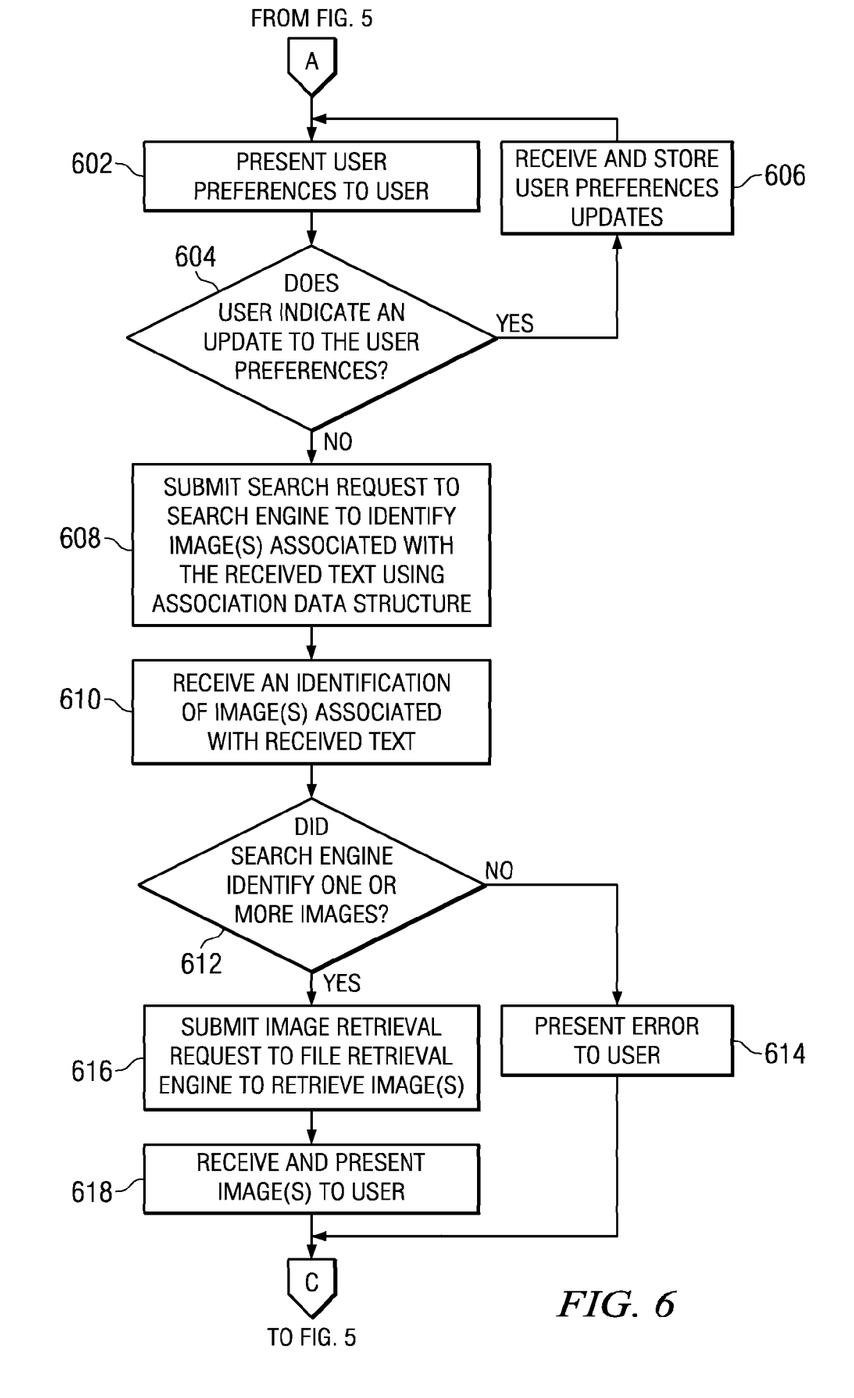
FIG. 6 depicts an exemplary operation of the text-to-image application in order to retrieve an image associated with a text value in accordance with an illustrative embodiment.
Figure 7:
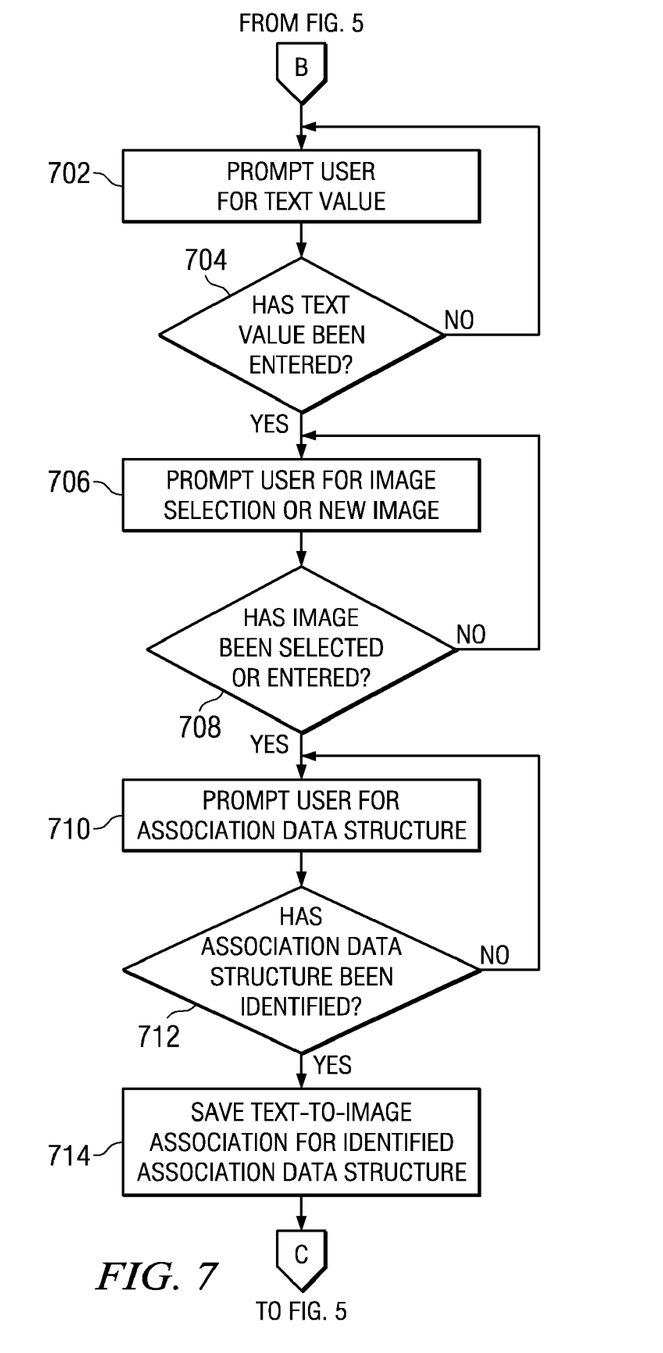
FIG. 7 depicts an exemplary operation of the text-to-image application in order to add or modify an association to the association data structure in accordance with an illustrative embodiment.

FIGS. 5, 6, and 7 are flowcharts that illustrate translating text into visual imagery content according to the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present application.

FIG. 5 depicts an exemplary initial operation of the text-to-image application in accordance with an illustrative embodiment. As the operation begins, the text-to-image translation application is initialized (step 502). The application determines, either by prompting the user or by analyzing user preferences, whether an update should be performed with a remote data structure, such as third party 318 of FIG. 3 (step 504). If at step 504 the user indicates that an update should be performed, the application initializes contact with the remote data structure and checks for updates to the associations in the association data structure (step 506). If there are updates available, the application downloads and stores the updated associations and any new images related to the updated associations (step 508), with the operation proceeding to step 510.

If at step 504 the user fails to indicate that an update should be performed, or from step 508, the application then determines if an indication has been received to close the application (step 510). If at step 510 the application determines that the user has indicated closing the application, the operation ends. If at step 510, the computing device fails to detect the user closing the computing device, the application determines if a request has been received from the user (step 512). If at step 512 the application fails to detect a request from the user, then the operation returns to step 510. If at step 512 the application determines that a request has been received, then the application determines if the request is to retrieve an image associated with a text value input by the user (step 514).

If at step 514 the request is to retrieve an image associated with a text value the operation proceeds to FIG. 6. If at step 514 the request is not to retrieve an image associated with a text value but rather to add or modify an association to the association data structure, the operation proceeds to FIG. 7.

FIG. 6 depicts an exemplary operation of the text-to-image application in order to retrieve an image associated with a text value in accordance with an illustrative embodiment. As the operation begins, the application presents the user preferences in a graphical user interface to the user (step 602). While the user may update other preferences during this verification, the application is mainly concerned with the user verifying the order in which the subordinate association data structures, if any, in the association data structure are searched. The order in which the subordinated association data structures are searched is stored in the user preferences. The application then determines if the user indicates that the user preferences should be updated (step 604).

If at step 604 the user indicates that the user preferences should be updated, the application receives the updated preferences and stores them in user preferences association with the application (step 606) with the operation returning to step 602 thereafter. If at step 604 the user verifies the current user preferences, the application submits the received text value to a search engine so that the search engine may search an association data structure for images associated with the received text value (step 608). The search engine communicates with the association data structure, using known network communication protocols, to perform a search for images association with the received text value. The application receives an indication from the search engine whether any images associated with the received text value were identified (step 610).

The application then determines, based on the response received from the search engine, if any images were identified (step 612). If at step 612 the search engine failed to identify any images, the application presents an error to the user (step 614), with the operation retuning to step 510 of FIG. 5 thereafter. If at step 612 the search engine identifies one or more images associated with the received text value, the application may send a request to a file retrieval engine to retrieve the identified images (step 616). The application receives the images retrieved by the file retrieval engine and presents the images to the user using the graphical user interface (step 618), with the operation retuning to step 510 of FIG. 5 thereafter.

FIG. 7 depicts an exemplary operation of the text-to-image application in order to add or modify an association to the association data structure in accordance with an illustrative embodiment. As the operation begins, the application prompts the user for the text value that is to be added or modified (step 702). The application determines if the text value has been entered (step 704). If at step 704 the user has not entered the text value, the operation returns to step 702. If at step 704 the user has entered the text value, the application prompts the user to select an image from image data structure or provide a new image (step 706). If the operation is to modify an existing association, the application may retrieve any currently associated images using the operation described in FIG. 6.

The application then determines if an image has been selected or entered (step 708). If at step 708 the user has not selected or entered the image, the operation returns to step 706. If at step 706 the user has selected or entered the image, the application prompts the user for an association data structure to categorize the association under (step 710). The application determines if an association data structure has been identified (step 712). If at step 712 the user has not identified the association data structure, the operation returns to step 710. If at step 712 the user has identified the association data structure, the application saves the text-to-image association in the identified association data structure (step 714), with the operation retuning to step 510 of FIG. 5 thereafter.

Thus, the illustrative embodiments provide mechanisms for translating text into visual imagery content. The performed text translation may be based on language associations, regional associations, user associations, and/or other types of associations. Each of the associations may be updated by the user or the user may update the associations by downloading associations from other association data structures. The translation mechanisms present the text translation to the user in the form of one or more images, which the user may then present to another person that does not speak the user's native language in order to convey a message.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for translating text into visual imagery content, comprising:
   receiving a request to identify at least one image associated with a text value;
   identifying at least one association category from a plurality of association categories with which to perform a search;
   searching a data structure, using the at least one association category, for an identification of the at least one image that is associated with the text value, wherein the at least one image is a visual representation of the text value;
   determining whether an update should be performed to one or more association categories within the plurality of association categories;
   responsive to an indication to perform an update of the one or more association categories, updating at least one text-to-image association in the one or more association categories;
   responsive to identifying at least one image associated with the text value, retrieving the at least one image; and
   presenting the at least one image in a graphical user interface to a user.

2. The method of claim 1, wherein the text value is at least one of a word or a phrase.

3. The method of claim 1, wherein identifying the at least one association category is performed with respect to a priority of the plurality of association categories, wherein the priority of the plurality of association categories is set by the user, and wherein the priority of the plurality of association categories is stored in user preferences.

4. The method of claim 1, wherein the plurality of association categories are at least one of a regional association category, a language association category, or a user-defined association category.

5. The method of claim 1, further comprising:
   responsive to a failure to identify the at least one image associated with the text value, presenting an error in a graphical user interface to a user.

6. The method of claim 1, wherein updating the at least one text-to-image association comprises:
   identifying a target text value to be updated;
   identifying at least one of an existing image or a new image to associate with the target text value, to form at least one target image;
   associating the target text value with the at least one target image to form an updated text-to-image association; and
   storing the updated text-to-image association in the one or more association categories.

7. The method of claim 1, wherein updating the at least one text-to-image association comprises:
   retrieving the at least one text-to-image association from a third party to form an updated text-to-image association; and
   storing the updated text-to-image association in the one or more association categories.

8. A computer program product comprising a computer useable medium storing a computer readable program, wherein the computer readable program, when executed in a data processing system, causes the data processing system to:
   receive a request to identify at least one image associated with a text value;
   identify at least one association category from a plurality of association categories with which to perform a search;
   search a data structure, using the at least one association category, for an identification of the at least one image that is associated with the text value, wherein the at least one image is a visual representation of the text value;
   determine whether an update should be performed to one or more association categories within the plurality of association categories;
   responsive to an indication to perform an update of the one or more association categories, update at least one text-to-image association in the one or more association categories;
   responsive to identifying at least one image associated with the text value, retrieve the at least one image; and
   present the at least one image in a graphical user interface to a user.

9. The computer program product of claim 8, wherein the computer readable program to identify the at least one association category is performed with respect to a priority of the plurality of association categories, wherein the priority of the plurality of association categories is set by the user, and wherein the priority of the plurality of association categories is stored in user preferences.

10. The computer program product of claim 8, wherein the computer readable program further causes the data processing system to:
    responsive to a failure to identify the at least one image associated with the text value, present an error in a graphical user interface to a user.

11. The computer program product of claim 8, wherein the computer readable program to update the at least one text-to-image association further includes computer readable program that causes the data processing system to:
    identify a target text value to be updated;
    identify at least one of an existing image or a new image to associate with the target text value, to form at least one target image;
    associate the target text value with the at least one target image to form an updated text-to-image association; and
    store the updated text-to-image association in the one or more association categories.

12. The computer program product of claim 8, wherein the computer readable program to update the at least one text-to-image association further includes computer readable program that causes the data processing system to:
    retrieve the at least one text-to-image association from a third party to form an updated text-to-image association; and
    store the updated text-to-image association in the one or more association categories.

13. A system, comprising:
    a processor; and
    a memory coupled to the processor, wherein the memory comprises instructions which, when executed by the processor, cause the processor to:
    receive a request to identify at least one image associated with a text value;
    identify at least one association category from a plurality of association categories with which to perform a search;
    search a data structure, using the at least one association category, for an identification of the at least one image that is associated with the text value, wherein the at least one image is a visual representation of the text value;
    determine whether an update should be performed to one or more association categories within the plurality of association categories;
    responsive to an indication to perform an update of the one or more association categories, update at least one text-to-image association in the one or more association categories;
    responsive to identifying at least one image associated with the text value, retrieve the at least one image; and
    present the at least one image in a graphical user interface to a user.

14. The system of claim 13, wherein the instructions to identify the at least one association category is performed with respect to a priority of the plurality of association categories, wherein the priority of the plurality of association categories is set by the user, and wherein the priority of the plurality of association categories is stored in user preferences.

15. The system of claim 13, wherein the instructions further cause the processor to:
    responsive to a failure to identify the at least one image associated with the text value, present an error in a graphical user interface to a user.

16. The system of claim 13, wherein the instructions to update the at least one text-to-image association further cause the processor to:
    identify a target text value to be updated;
    identify at least one of an existing image or a new image to associate with the target text value, to form at least one target image;
    associate the target text value with the at least one target image to form an updated text-to-image association; and
    store the updated text-to-image association in the one or more association categories.

17. The system of claim 13, wherein the instructions to updating the at least one text-to-image association further cause the processor to:
    retrieve the at least one text-to-image association from a third party to form an updated text-to-image association; and
    store the updated text-to-image association in the one or more association categories.

* * * * *